United States Patent
Brezuleanu et al.

(10) Patent No.: US 6,363,742 B1
(45) Date of Patent: Apr. 2, 2002

(54) ACCUMULATOR FOR AN AIR CONDITIONING SYSTEM

(75) Inventors: Anca Brezuleanu, Hobscheid; Jean-Francois Launois, Bonnert, both of (BE); Thomas Engel, Perl (DE); Kevin Herlan, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/573,899

(22) Filed: May 18, 2000

(30) Foreign Application Priority Data

Jun. 11, 1999 (GB) .............................. 9913515

(51) Int. Cl.$^7$ .............................................. F25B 43/00
(52) U.S. Cl. ...................................................... 62/503
(58) Field of Search ...................... 62/503, 498, 474; 96/200, 204, 205; 210/455, 456, DIG. 6, DIG. 7; 29/902

(56) References Cited

U.S. PATENT DOCUMENTS

| | | | | |
|---|---|---|---|---|
| 2,121,253 A | * | 6/1938 | McGuffey | 62/115 |
| 5,282,370 A | * | 2/1994 | Kiblawi et al. | 62/503 |
| 5,419,157 A | * | 5/1995 | Kiblawi et al. | 62/503 |
| 5,837,039 A | * | 11/1998 | LeConey et al. | 96/121 |
| 5,887,444 A | * | 3/1999 | Toyoshima et al. | 62/192 |
| 5,914,456 A | * | 6/1999 | LeConey et al. | 96/121 |
| 6,167,720 B1 | * | 1/2001 | Chisnell | 62/474 |
| 6,209,347 B1 | * | 4/2001 | Corrigan et al. | 62/475 |

OTHER PUBLICATIONS

Patent Abstract of Japan, Publication No. 04139366 A, Date of Publication May 13, 1992.
Patent Abstract of Japan, Publication No. 07012431 A, Date of Publication Jan. 17, 1995.
Patent Abstract of Japan, Publication No. 09210509 A, Date of Publication Aug. 12, 1997.

* cited by examiner

Primary Examiner—Mark Paschall
Assistant Examiner—Daniel Robinson
(74) Attorney, Agent, or Firm—Patrick M. Griffin

(57) ABSTRACT

An accumulator (24) for an air conditioning system (10) comprising a housing (26) having a first end wall (28), a second end wall (30), and a side wall (32) joining the end walls; a fluid outlet pipe (36) mounted in, and passing through, the first end wall; and a fluid inlet pipe (34) mounted in, and passing through, the first end wall; wherein the outlet pipe has an open end (38) inside the housing positioned adjacent the first end wall; and wherein the inlet pipe comprises a first section (40) and a second section (42) inside the housing, the first section being attached at one end (44) to the first end wall and being attached at the other end (46) to the second section, the second section being open at at least one end (48) with the or each open end facing a portion (50) of the side wall. Reduces the risk of liquid refrigerant fluid passing into the outlet pipe.

6 Claims, 2 Drawing Sheets

ACCUMULATOR FOR AN AIR CONDITIONING SYSTEM

TECHNICAL FIELD

The present invention relates to an accumulator for an air conditioning system.

BACKGROUND OF THE INVENTION

Air conditioning systems for the passenger compartment of motor vehicles are well known. In general, these systems comprise two heat exchangers, a compression/circulation device, and a thermal expansion device. One heat exchanger is located inside the passenger compartment and is designed to cool and dehumidify the incoming air (passing through the heat exchange and entering the passenger compartment) through heat absorption. The other heat exchanger is typically located outside of the passenger compartment and is designed to reject the heat generated during compression and absorption. A pair of fluid passages connect the heat exchangers to allow the circulation of a working fluid. The expansion device is positioned in one of the fluid passages. The compressor and an accumulator are positioned in the other fluid passage. The working fluid is pumped by the compressor through the outside heat exchanger, the expansion device, the inside heat exchanger and the accumulator in succession. The fluid enters the expansion device as sub-cooled liquid and exits the expansion device as a mix of liquid with vapour bubbles therein. The mixed fluid enters the inside heat exchanger and absorbs heat, continuing the process of vapour generation within the fluid. The accumulator functions as a separator for the liquid and vapour, allowing substantially only vapour to progress to the compressor. The accumulator can have an inlet pipe and an outlet pipe mounted in the side walls of the accumulator housing. In order to allow a reduction in size of the accumulator, it has been proposed to mount the inlet and outlet pipes in an end wall of the accumulator housing. The latter arrangement has been found to increase the risk of a mixture of liquid and vapour passing through the outlet pipe to the compressor, due to excessive internal agitation, leading to inefficient operation of the air conditioning system and risk of damage to the compressor. In order to overcome this problem, it has been proposed to place a baffle inside the accumulator. However, such an arrangement reduces the storage capabilities of the accumulator, or increases the size of the accumulator, and contributes to increased pressure drop.

SUMMARY OF THE INVENTION

It is an object of the present invention to overcome the above mentioned problem.

An accumulator in accordance with the present invention for an air conditioning system comprises a housing having a first end wall, a second end wall, and a side wall joining the end walls; a fluid outlet pipe mounted in, and passing through, the first end wall; and a fluid inlet pipe mounted in, and passing through, the first end wall; wherein the outlet pipe has an open end inside the housing positioned adjacent the first end wall; and wherein the inlet pipe comprises a first section and a second section inside the housing, the first section being attached at one end to the first end wall and being attached at the other end to the second section, the second section being open at at least one end with the or each open end facing a portion of the side wall.

In the present invention, the arrangement of the inlet pipe inside the accumulator housing is such as to reduce and divert the energy of the refrigerant fluid as the fluid enters the housing. Such an arrangement helps to reduce agitation of, and foaming of, the fluid inside the housing, reducing the risk of liquid refrigerant fluid passing into the outlet pipe.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
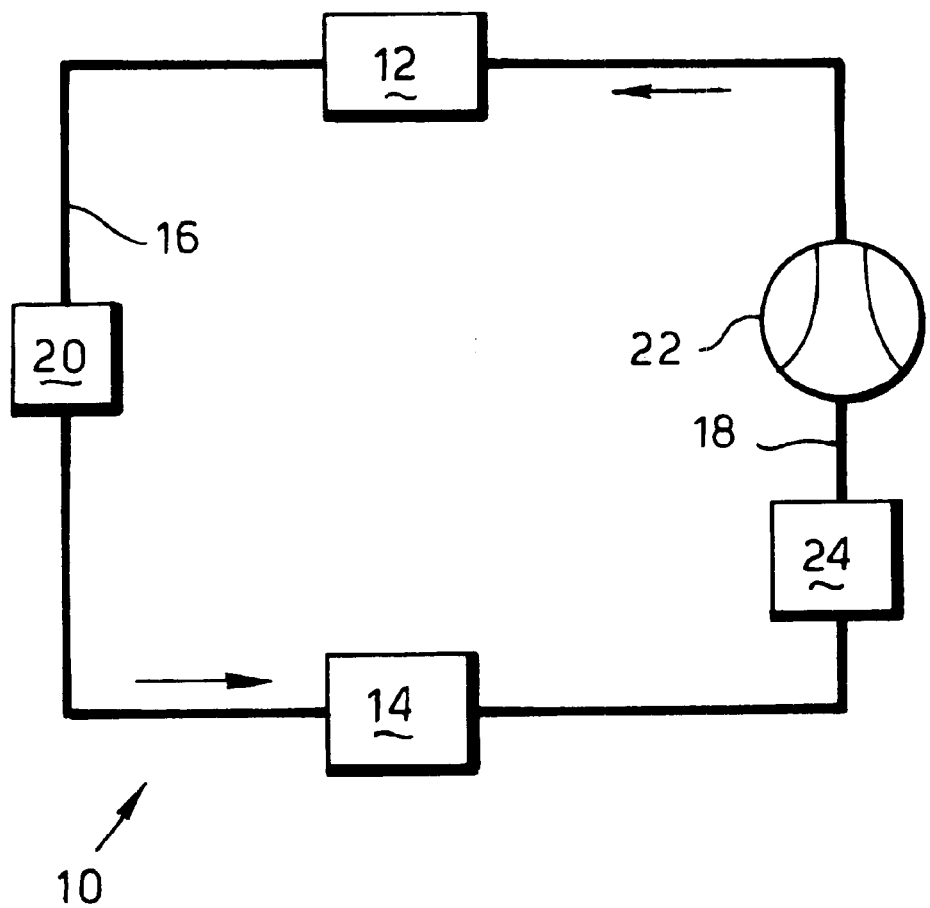
FIG. 1 is a schematic circuit diagram of an air conditioning system for the passenger compartment of a motor vehicle.

An air conditioning system 10 for the passenger compartment of a motor vehicle is shown schematically in FIG. 1. The system 10 includes an outside heat exchanger 12 (located outside of the passenger compartment) and an inside heat exchanger 14 (located inside the passenger compartment). First and second fluid passages 16, 18 fluidly connect the inside and outside heat exchangers to allow the circulation of refrigerant fluid through the heat exchangers. An expansion device 20 is positioned in the first fluid passage. A compressor 22 and an accumulator 24 are positioned in the second fluid passage. When refrigerant fluid is pumped by the compressor 22 through the outside heat exchanger 12, the expansion device 20, the inside heat exchanger 14 and the accumulator 24, in succession, air passing through the inside heat exchanger is cooled as the air flows into the passenger compartment. The accumulator 24 acts to separate and retain the liquid portion of the pumped refrigerant fluid such that substantially only the vapour portion of the pumped fluid passes through the accumulator to reach the compressor 22.

Figure 2:
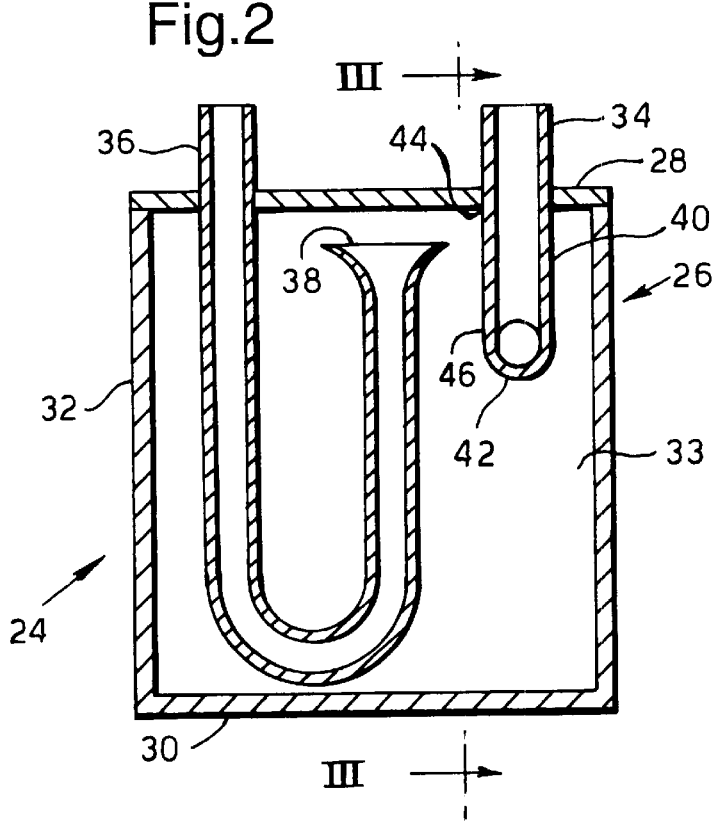
FIG. 2 is a cross-sectional view of an accumulator in accordance with the present invention for use in the air conditioning system of FIG. 1.
Figure 3:
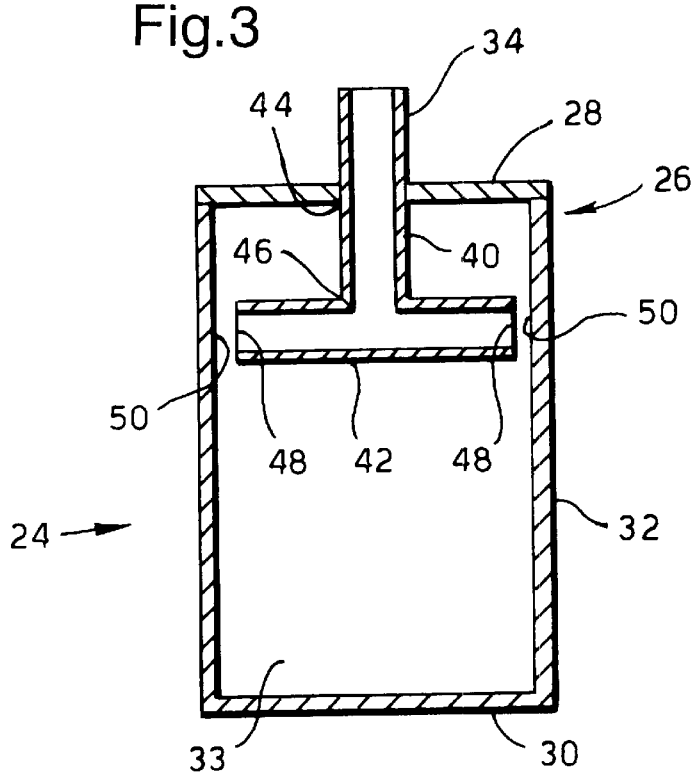
FIG. 3 is a cross-sectional view of the accumulator on the line III—III of FIG. 2.

In accordance with the present invention, the accumulator 24 (as shown in FIGS. 2 and 3) comprises a housing 26 having first and second end walls 28, 30; and a side wall 32 connecting the end walls to define a fluid chamber 33 inside the housing. When installed, the first end wall 28 defines an upper wall, and the second end wall 30 defines a lower wall. A fluid inlet pipe 34 and a fluid outlet pipe 36 are mounted in, and extend through, the first end wall 28. The outlet pipe 36 has an open end 38 inside the housing 26 adjacent, and opening towards, the first end wall 28. The inlet pipe 34, inside the housing 26, has a first section 40 and a second section 42, and is preferably injection moulded in one piece from plastics material. The first section 40 is attached at one end 44 to the first end wall 28, and preferably extends in a direction substantially perpendicular to the first end wall. The second section 42 is attached, preferably at the mid-point of the second section, to the other end 46 of the first section 40 and preferably extends in a direction substantially parallel to the first end wall 28. When the accumulator 24 is installed in a motor vehicle, the inlet pipe 34 therefore preferably has a substantially inverted T-shape inside the housing 26.

The second section 42 of the inlet pipe 34 is open at each end 48 thereof. Each open end 48 faces, and is preferably positioned adjacent, a portion 50 of the side wall 32. In use, refrigerant fluid entering the accumulator 24 through the inlet pipe 34 is divided into two separate paths by the second section 42 and then impinges on the portions 50 of the side wall 32. The direction of flow of the refrigerant fluid is therefore substantially perpendicular to the side wall 32 as the fluid impacts with the side wall. Such an arrangement diverts and reduces the energy of the fluid as the fluid enters the accumulator 24 to help reduce agitation of, and foaming of, the fluid in the fluid chamber 33, thereby reducing the risk of liquid refrigerant fluid passing into the outlet pipe 36. The present invention therefore overcomes the problems of previously known accumulators without using a baffle and without reducing the storage capabilities of the accumulator.

As shown in FIG. 3, the ends 48 of the second section 42 are cut to be substantially parallel to the side wall 32. In an alternative arrangement, the ends 48 of the second section 48 may be cut to be at an acute angle to the side wall 32. In further alternative arrangements, the first section 40 may extend at an angle other than 90 degrees to the first end wall 28, and/or the second section 42 may extend other than parallel to the first end wall.

As an alternative to the above described arrangement, the second section 42 of the inlet pipe 34 may only have a single open end 48 such that the inlet pipe is substantially L-shaped inside the housing 26. In a further alternative, the second section 42 of the inlet pipe 34 may comprise multiple paths and have multiple (greater than two) open ends 48 directing incoming fluid onto multiple portions 50 of the side wall 32 of the housing 26 at substantially ninety degrees thereto.

In the present invention, the fluid entering the accumulator is diverted to impinge on a portion of the side wall of the housing at substantially ninety degrees thereto, helping to reduce the energy and reduce the risk of excessive agitation of the fluid inside the accumulator. The present invention allows the inlet and outlet pipe to be mounted in the end wall of the accumulator without the need for an internal baffle (and hence without the need to increase size), thereby reducing assembly time.

What is claimed is:

1. An accumulator for an air conditioning system comprising a housing having a first end wall, a second end wall, and a side wall joining the end walls; a fluid outlet pipe mounted in, and passing through, the first end wall; and a fluid inlet pipe mounted in, and passing through, the first end wall; wherein the outlet pipe has an open end inside the housing positioned adjacent the first end wall; and wherein the inlet pipe comprises a first section and a second section inside the housing, the first section being attached at one end to the first end wall and being attached at the other end to the second section, the second section being open at least one end with each open end facing a portion of the side wall.

2. An accumulator as claimed in claim 1, wherein each open end of the second section of the inlet pipe is positioned adjacent the corresponding portion of the side wall.

3. An accumulator as claimed in claim 1 or claim 2, wherein each open end of the second section of the inlet pipe is cut to be substantially parallel with the side wall.

4. An accumulator as claimed in any one of claims 1 to 3, wherein the first section of the inlet pipe extends in a direction substantially perpendicular to the first end wall.

5. An accumulator as claimed in any one of claims 1 to 4, wherein the second section of the inlet pipe extends in a direction substantially parallel to the first end wall.

6. An accumulator as claimed in any one of claims 1 to 5, wherein the first section of the inlet pipe is attached to the second section at substantially the mid-point of the second section, and wherein the second section has two open ends.

* * * * *